Feb. 21, 1967  E. FRANKL  3,305,205
TOGGLE-TYPE EASEL
Filed March 1, 1965  9 Sheets-Sheet 1

Feb. 21, 1967   E. FRANKL   3,305,205
TOGGLE-TYPE EASEL
Filed March 1, 1965   9 Sheets-Sheet 2

Feb. 21, 1967  E. FRANKL  3,305,205
TOGGLE-TYPE EASEL
Filed March 1, 1965  9 Sheets-Sheet 3

Feb. 21, 1967 E. FRANKL 3,305,205
TOGGLE-TYPE EASEL
Filed March 1, 1965 9 Sheets-Sheet 4

Feb. 21, 1967     E. FRANKL     3,305,205
TOGGLE-TYPE EASEL

Filed March 1, 1965     9 Sheets-Sheet 5

E. FRANKL

3,305,205

TOGGLE-TYPE EASEL

Filed March 1, 1965

United States Patent Office 3,305,205
Patented Feb. 21, 1967

3,305,205
TOGGLE-TYPE EASEL
Ernest Frankl, Middleboro, Mass., assignor to Winthrop-Atkins Co., Inc., Middleboro, Mass., a corporation of Massachusetts
Filed Mar. 1, 1965, Ser. No. 435,807
17 Claims. (Cl. 248—459)

This invention relates to calendar pads and photograph mounts of the easel type in which a rigid panel is adapted to be raised from a position parallel to a base to an inclined position and, in particular, to improved toggle means which facilitates raising the panel to its inclined position and holding it in this position; to provide a structure in which the setting of the toggle in its operative position is assisted by the inherent tendency of the panel to return to its undisplaced position; to provide a structure in which the toggle means not only is functional but also enhances the appearance of the structure; and to provide a structure which can be manufactured easily by means of conventional dieing and glueing machinery.

As herein illustrated, the structure comprises a rigid base, a first part secured along one end to the base which is resistant to deflection away from the base, and second and third parts hinged, respectively, to each other along their proximal ends and to the base and first part at their distal ends. The second and third parts constitute a toggle situated between the base and first part and the hinge at their proximal ends constitute the knee of the toggle which is adapted to occupy one of two positions, one of which is situated between the base and the first part and the other of which is situated rearwardly of the base and first part. The knee when located at the closer position supports the third part parallel to and in contact with the first part and when located in the remote position permits folding of the parts into parallel relation.

The invention will now be described in greater detail with reference to the accompanying drawings wherein.

The several structures illustrated herein embody the same structure features, to wit, toggle means operable, on the one hand, to hold the component parts of the structure set up for use and, on the other hand, to enable folding the component parts into substantially parallel relation so as to form a compact package.

Figures 1, 2, 3, 4, 5, 5A, 6, 7, 7A, 7B:
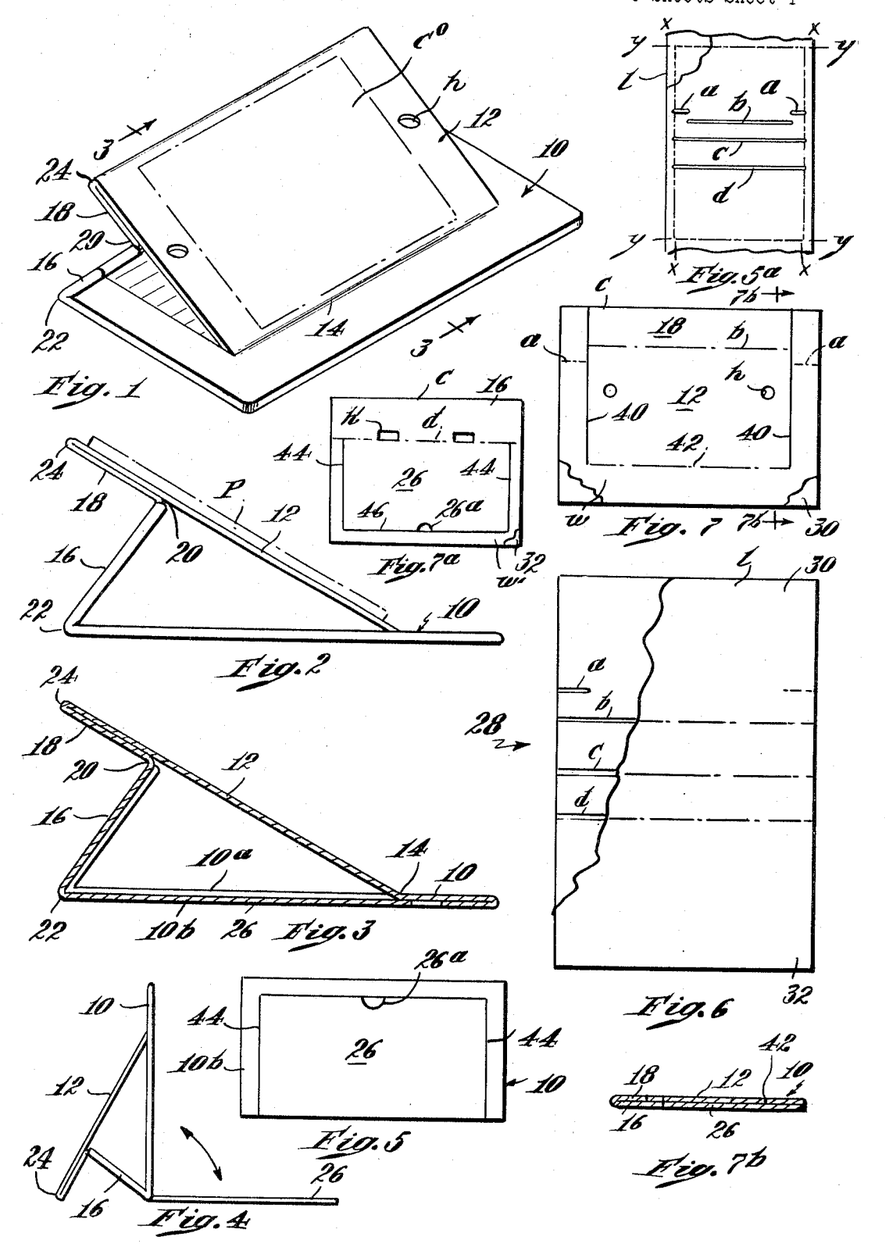
FIG. 1 is a perspective view of the structure.
FIG. 2 is an end elevation as seen from the left end of FIG. 1.
FIG. 3 is a vertical section taken on the line 3—3 of FIG. 1.
FIG. 4 is an end elevation showing the structure rotated in a counterclockwise direction to expose the upper surface of an index card.
FIG. 5 is a plan view of the bottom of the structure showing the index card.
FIG. 5a is a plan view of the initial step in making the blank.
FIG. 6 is a plan view of a blank for making the structure.
FIG. 7 is a plan view of one side of the blank after it has been folded and prior to setting up.
FIG. 7a is a plan view of the other side of the blank shown in FIG. 7.
FIG. 7b is a section taken on the line 7b—7b of FIG 7.

As shown in FIG. 1 to 7b, inclusive, the structure comprises a part 10 which constitutes a base and a part 12 connected to the part 10 by a hinge 14 so that it extends upwardly and rearwardly from the base to provide support on its upwardly inclined surface for a calendar pad $c°$, photograph, or the like, and which may optionally be provided with holes $h$ in which are set the lower ends of writing implements. The hinge 14 is made so as to resist rotation of the part 12 to the upwardly inclined position shown, and the latter is held in this upwardly inclined position by parts 16 and 18 connected at their proximal ends by a hinge 20 and at their remote ends by hinges 22 and 24 to the parts 10 and 12 respectively. The parts 16 and 18 constitute a toggle in which the hinge 20 is the knee and the latter is movable relative to the line of centers of the hinges 22 and 24 to take up a position inwardly of this line in which the knee bears against the underside of the part 12 and which is held in this position by the reactive force of the part 12 to return to its position parallel to the part 10, or to a position rearwardly of the line which permits collapse of the toggle and folding of the parts 12 and 18 into recesses in the parts 10 and 16 from which they were cut, as will appear hereinafter, so that the collapsed structure is perfectly flat (FIGS. 7a and 7b).

The part 10, as will appear hereinafter, is comprised of two plies 10a, 10b and the lower ply 10b has in it a part 26 which is separated therefrom along three sides (FIG. 5) and connected together with the ply from which it is cut along its rear side to the part 16. The part 26 provides an index card normally concealed at the underside of the structure which may be exposed by rotating the structure in a counterclockwise direction as shown by the arrow in FIG. 4. A notch 26a may be provided in the forward edge of the part 26 to free it from the bottom ply if required.

The structure is made by cutting slots $a—a$, $b$, $c$ and $d$ in spaced parallel relation as shown in FIG. 5a is a sheet of paperboard of the kind and weight usually employed in making calendar mounts, applying a lining $l$ of paper to one side and then cutting the board along lines X—X, Y—Y to remove from the board a blank 28 such as shown in FIG. 6. The slots $a—a$ and $d$ become the hinge 22; the slot $b$ the hinge 24; and the slot $c$ the hinge 20 in the final structure and provide for flexibility of the parts in either direction relative to each other. The slot $c$, which constitutes the hinge 20 in the structure, divides the blank into substantially equal sections 30 and 32 and these sections are now folded into engagement with each other with the lining $l$ on the inside. A wrapping $w$ is applied to the folded structure to cover the entire outer side of the part 30 (FIG. 7) about the edges of the parts 30 and 32 and onto the outer side of the part 32. A sheet of wrapping $w'$ is then applied to the outer side of the part 32 (FIG. 7a) to cover the overlapping edges of the wrapping $w$. Special parallel cuts 40—40 are now made in the part 30 starting at the slot $c$ and extending through the ends of the slots $b$ and $a—a$ toward the distal end and an impression 42 is made transversely of the part to join the ends of the cuts 40—40. The holes $h$ are punched in the part 32 simultaneously with the making of the cuts. Spaced parallel cuts 44—44 are made in the part 32 starting with the slot $d$ and extending toward the distal end of the part. The cuts 44—44 are joined by a cut 46 parallel to the distal end. The cuts 40—40 separate the parts 12 and 18 from the part 30. The cuts 44—44 separate the part 26 from the part 32. Holes $h'$ are made in the part 32 simultaneously with the cuts 44—44 to enable stapling a pad to the part 12 after folding of the parts. By folding the part 16 forwardly from the rear edge of the part 10, the toggle constituted by the parts 16 and 18 will lift the part 12 upwardly from the part 10 to an inclined position such as shown in FIG. 1, where it will be supported by the engagement of the knee 20 with the underside thereof.

The second structure, as shown in FIGS. 8 to 13a, inclusive, comprises a part 44 which constitutes a base, an upwardly and rearwardly inclined part 46 connected to the part 44 by a hinge 48 which is adapted to support a calendar pad, or the like, and parts 50 and 52 connected at their proximal ends by a hinge 54 and at their distal ends by hinges 56 and 58, respectively, to the parts 44 and 46. The parts 50 and 52 constitute a toggle in which the hinge 54 is a knee which is movable relative to the line of centers of the hinges 56 and 58 to a position inwardly thereof to support the part 46 in an angular position and outwardly thereof to permit folding of the parts 46 and 52 into recesses 47 and 53 in the parts 44 and 50 respectively. The resistance of the hinge 48 to deflection reacts to hold the toggle in the inwardly disposed position.

The part 44 is of two-ply construction having upper and lower plies 44a and 44b. The lower ply 44b is connected at the rear edge by the hinge 56 to the part 50 and provides a memorandum pad or telephone directory which is adapted to be exposed by rotation of the structure in a counterclockwise direction to the position shown in FIG. 11.

Figures 8, 9, 10, 11, 11A, 12, 13, 13A:
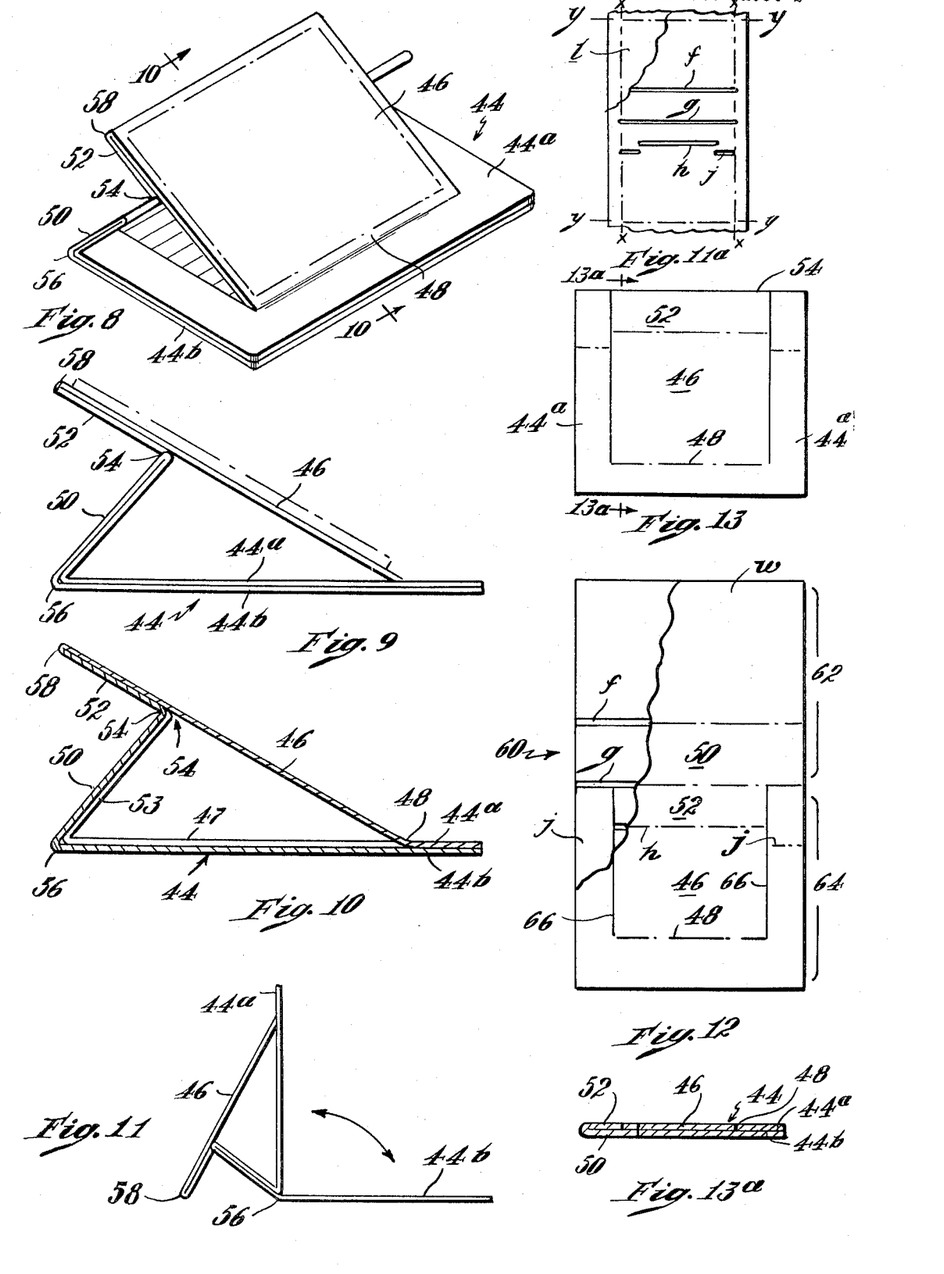
FIG. 8 is a perspective view of a second form of the structure.
FIG. 9 is an end elevation as seen from the left end of FIG. 8.
FIG. 10 is a vertical section taken on the line 10—10 of FIG. 8.
FIG. 11 is an end elevation of the structure rotated in a counterclockwise direction to expose a memorandum pad.
FIG. 11a is a plan view of the initial step in making the blank.
FIG. 12 is a plan view of the blank for making the structure.
FIG. 13 is a plan view of the blank folded to form the structure prior to setting up.
FIG. 13a is a section taken on the line 13a—13a of FIG. 13.

The structure is made by cutting spaced parallel slots $f$, $g$, $h$ and $j—j$ in a paperboard strip and applying a lining $l$ to one side as shown in FIG. 11a. Cuts X—X and Y—Y are now made made remove a blank 60 as shown in FIG. 12. The blank is wrapped on the side opposite the lining $l$ with a wrapper $w$ which is folded over onto the lining whereupon spaced parallel cuts 66—66 are made commencing at the slot $g$ and extending therefrom toward the distal end of the part 64 so as to intersect the ends of the slots $h$ and $j—j$. An impression 48 is made in the part 64 parallel to the end so as to intersect the cuts 66—66 thus separating the parts 46 and 52 from the part 64. The blank is now folded on the hinge formed by the slot $g$ to take the form shown in FIG. 13, whereupon a calendar pad or the like may be attached to the part 46. To set the structure up the part 50 is folded upwardly and forwardly so that the toggle constituted by the parts 50 and 52 lifts the part 46 upwardly to its angular position and holds the latter, by engagement of the knee 54, with its underside.

The parts 44a and 44b are not connected to each other forwardly of the hinge 56 and hence rotation of the part 44a in a counterclockwise direction relative to the hinge 56, as shown in FIG. 11, will expose the part 44b which is normally concealed when the structure occupies the position shown in FIG. 8. The upper surface of the part 44a may have on it lined memorandum sheets for receiving telephone numbers or the like.

FIGS. 14 to 18a, inclusive, show a third form of the structure which comprises a part 68, a part 70 secured to one edge of the part 68 and parts 72 and 74 connected to each other at their proximal ends by a hinge 76 and at their distal ends by hinges 78 and 80, respectively, to the parts 70 and 68. The parts 72 and 74 constitute a toggle in which the hinge 76 is the knee and is operable, by movement relative to the line of centers of the hinges 78 and 80, to support the part 70 at an angle to the part 68, or to permit the parts 70 and 72 to be folded into parallel relation to the parts 68 and 74. As illustrated, the part 70 is secured along one edge to a part 82 which, in turn, is connected to the part 68 by a hinge 84 which resists angular rotation of the part 70 relative to the part 68. Movement of the toggle parts 72 and 74 relative to the line of centers of the hinges 78 and 80 is resisted by the part 70 when the knee 76 of the toggle rests against the part 68.

Figures 14, 15, 16, 16A, 17, 18, 18A:
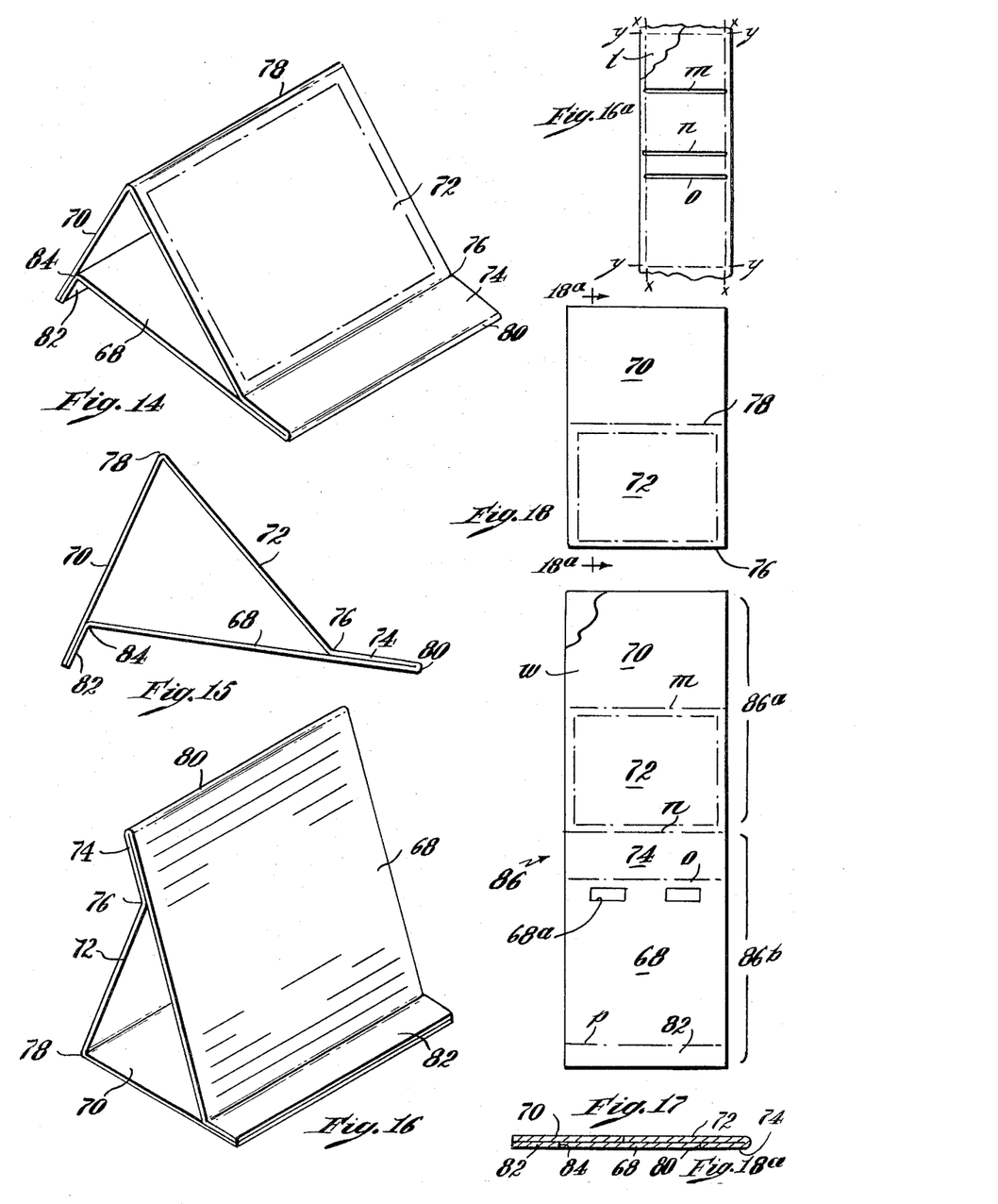
FIG. 14 is a perspective view of a third form of structure.
FIG. 15 is an end elevation as seen from the left end of FIG. 14.
FIG. 16 is a perspective view of the structure rotated in a counterclockwise direction to a second position for use.
FIG. 16a is a plan view of the initial step in making the blank.
FIG. 17 is a plan view of the blank of which the structure is made.
FIG. 18 is a plan view of the blank folded to form the structure prior to setting up.
FIG. 18a is a section taken on the line 18a—18a of FIG. 18.
Figure 19:
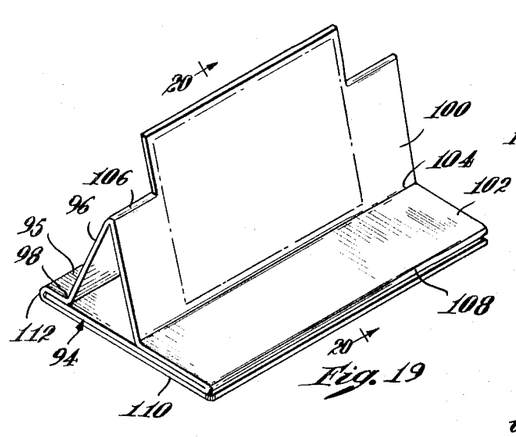
FIG. 19 is a perspective view of a fourth form of the invention.
Figure 20:
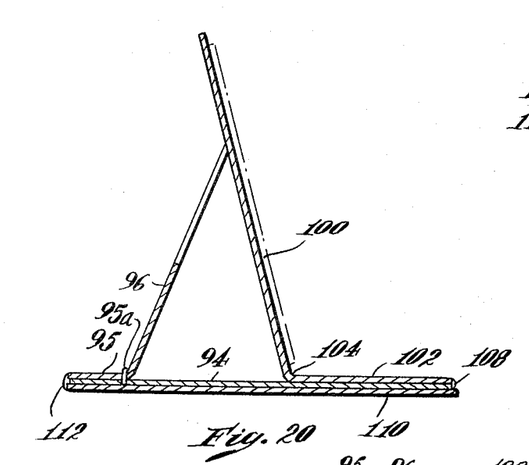
FIG. 20 is a vertical section taken on the line 20—20 of FIG. 19.

The toggle part 72 in the position of the structure shown in FIGS. 14 and 15 provides an upwardly inclined support for a calendar pad or photograph. Optionally, the structure may be rotated in a counterclockwise direction from that shown in FIGS. 14 and 15, to a position such as shown in FIG. 16, wherein the part 68 becomes an upwardly inclined support for a calendar pad or photograph and the part 70 the supporting base.

The structure is made by cutting spaced parallel slots m, n and o in a paperboard strip (FIG. 16a), applying a liner sheet l to one side of the board and then cutting through the board along lines X—X, Y—Y to separate from the board a blank 86 as shown in FIG. 17. The slot n divides the blank into two parts 86a and 86b. The blank 86 is turned over and wrapped, if desired, by applying a wrapping sheet w to the side opposite the lining and folding it over the edges onto the lining l. After wrapping an impression p is made in the part 86b parallel to and near its distal end and transversely spaced holes 68a are punched near the slot o. The slots m, n, o and the impression p divide the blank into the parts 70, 72, 74, 68 and 82 and provide the hinges 76, 78, 80 and 84. The blank is folded on the slot n and the part 82 secured to the distal end of the part 70 by suitable means. The holes 68a enable fastening a calendar pad to the part 72 by means of staples after folding.

The folded blank (FIG. 18) may be set up easily by grasping the distal ends of the part 70 and the part 82 and rotating them in a counterclockwise direction about the hinge 84.

Figures 21, 22, 24A:
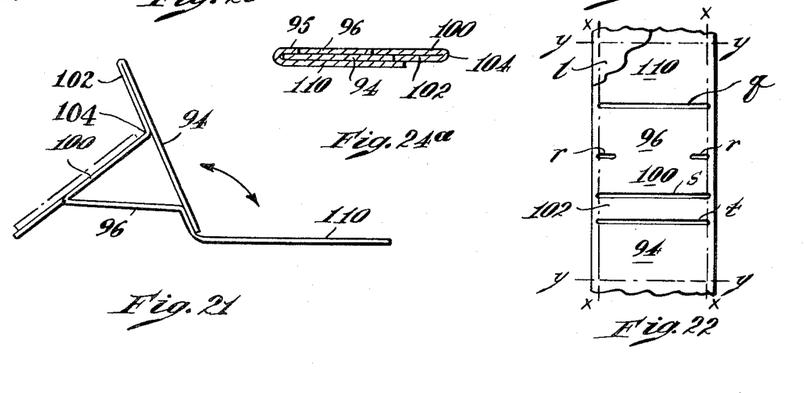
FIG. 21 is an elevation of the structure rotated in a counterclockwise direction to expose a memorandum card.
FIG. 22 is a plan view of the initial step in making the blank.
FIG. 24a is a section taken on the line 24a—24a of FIG. 24.

FIGS. 19 to 24a, inclusive, show a fourth form of the structure in which there is a part 94 which constitutes a base, a part 96 connected thereto by a hinge 98 and parts 100 and 102 connected at their proximal ends to each other by a hinge 104 and at their distal ends to the parts 96 and 94 by hinges 106 and 108. The hinge 98 is designed to resist angular movement of the part 96 relative to the part 94 and the parts 100 and 102 constitute a toggle in which the hinge 104 is the knee and which is operative, by movement inwardly of the line of centers of the hinges 106 and 108, to hold the part 96 at said angular position by engagement of the knee 104 with the part 94 and by movement outwardly of that line to allow the parts 96 and 100 to be collapsed to positions parallel to the parts 94 and 102. The toggle part 100 constitutes a support for a calender pad or photograph, and the appearance of the structure is enhanced by extending the part 100 above the hinges 106—106. The structure has a part 110 at the underside of the part 94 connected thereto along its rear edge by a hinge 112 which may be exposed by counterclockwise rotation of the structure, as shown in FIG. 21, to provide a telephone index or the like.

Figure 23:
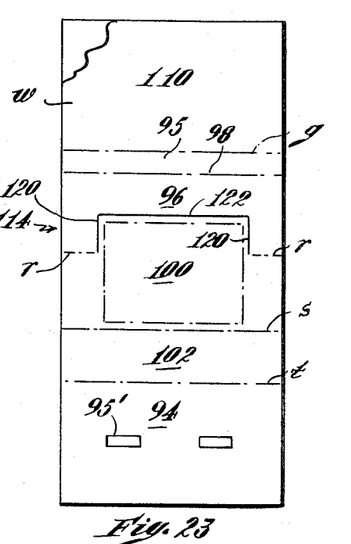
FIG. 23 is a plan view of the blank of which the structure is made.
Figure 24:
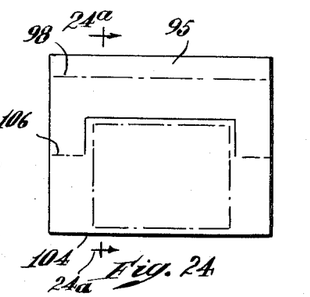
FIG. 24 is a plan view of the blank folded to form the structure prior to setting up.
Figures 25, 26A:
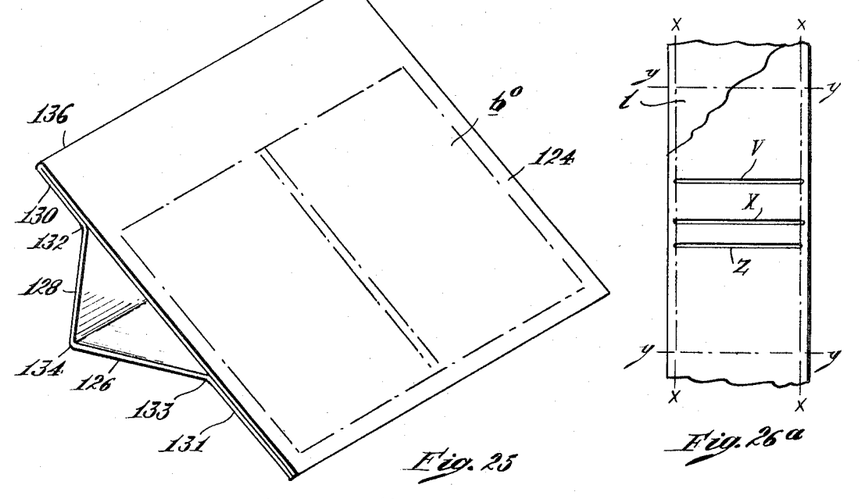
FIG. 25 is a perspective view of a fifth form of structure.
FIG. 26a is a plan view of the initial step in making the blank.

The structure is made by cutting parallel slots q, r—r, s and t in a paperboard strip (FIG. 22), applying a lining l to one surface and then cutting through the sheet along lines X—X and Y—Y to separate from the sheet a blank 114 as shown in FIG. 23.

The slots q, r—r, s and t divide the blank into the parts 110, 96, 100, 102 and 94 and become the hinges 112, 106—106, 104 and 108. The blank is turned over and a wrapper sheet w is applied to the side opposite the lining whereupon spaced parallel cuts 120—120 are made commencing at the inner end of the slots r—r and extending toward the slot q and these are joined by a transverse cut 122 parallel to the slot q to form the extension at the top of the part 100. Holes 95' are cut in the part 94 and an impression 98 is made parallel to the slot q. The blank 114 is now folded on the hinge formed by the slot s and the distal end of the part 94 is secured to the part 95 by suitable means as, for example, staples. If a calendar pad is to be attached to the part 100 by staples, the latter are driven through the part 100 where the holes 95' are located. The part 110 is folded under the part 94 so that the completed structure takes the form shown in FIGS. 24 and 24a. The structure is easily set up for use by applying pressure rearwardly to the hinge 104.

A fifth form of the structure is shown in FIGS. 25 to 28a, inclusive, comprising a part 124, a part 126 secured along one edge to the part 124, and parts 128 and 130 connected at their proximal ends by a hinge 132 and at their distal ends by hinges 134 and 136 to the parts 126 and 124 respectively. The parts 128 and 130 comprise a toggle in which the hinge 132 is the knee. The knee is movable from a position at one side of the line of centers of the hinges 134 and 136 where it has contact with the underside of the part 124 and is yieldingly held in this position by the reactive force of the part 126 to a position at the opposite side of the line of centers which permits folding the parts 128 and 126 into parallel relation with the parts 130 and 124. The part 126 is connected to the part 124 by a part 131 and hinge 133 which resists angular movement of the part 126 away from the part 124.

Figures 26, 27, 28, 28A:
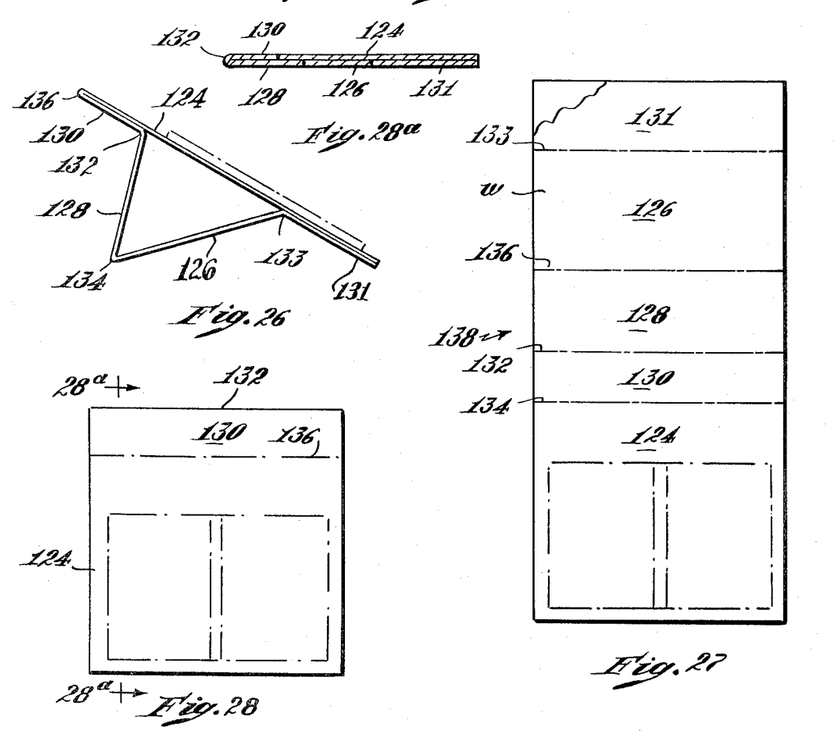
FIG. 26 is an end elevation as seen from the left end of FIG. 25.
FIG. 27 is a plan view of the blank from which the structure is made.
FIG. 28 is a plan view of a blank folded to make the structure but prior to setting up.
FIG. 28a is a section taken on the line 28a—28a of FIG. 28.
Figures 29, 30, 31, 32, 33, 34, 34A:
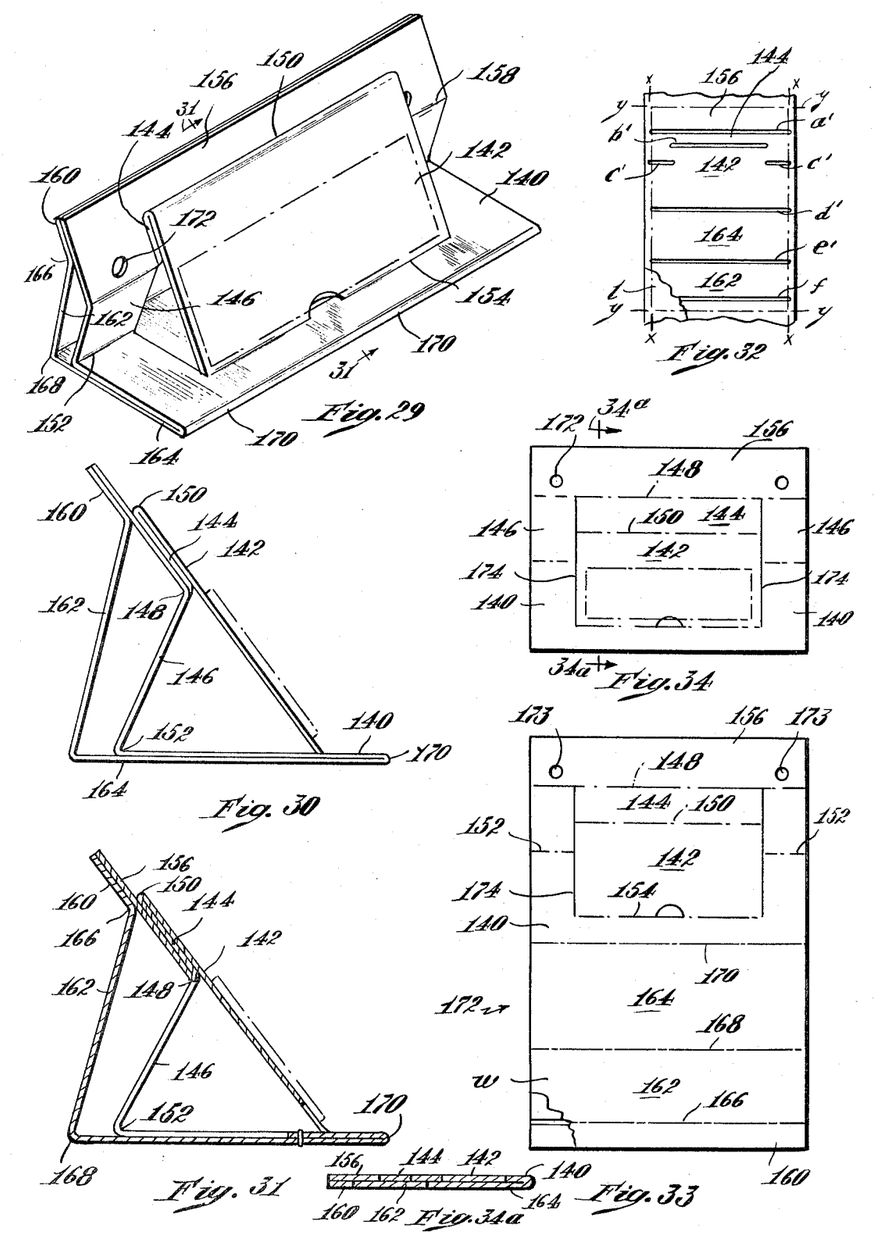
FIG. 29 is a perspective view of a sixth form of the structure.
FIG. 30 is an end elevation as seen from the left end of FIG. 29.
FIG. 31 is a vertical section taken on the line 31—31 of FIG. 29.
FIG. 32 is a plan view of the initial step in making the blank.
FIG. 33 is a plan view of the blank of which the structure is made.
FIG. 34 is a plan view of the blank folded to form the structure and prior to setting up.
FIG. 34a is a section taken on the line 34a—34a of FIG. 34.
Figure 35:
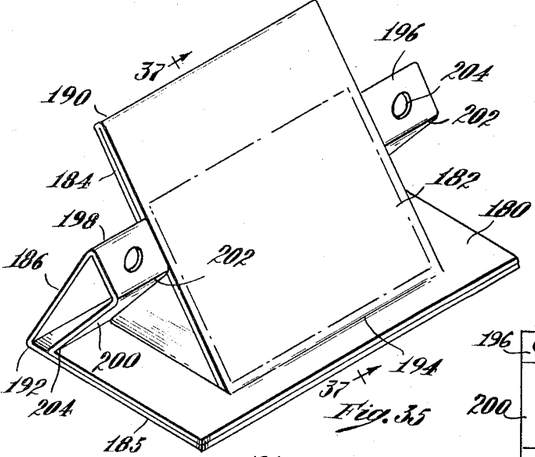
FIG. 35 is a perspective view of a seventh form of the structure.
Figures 36, 39A:
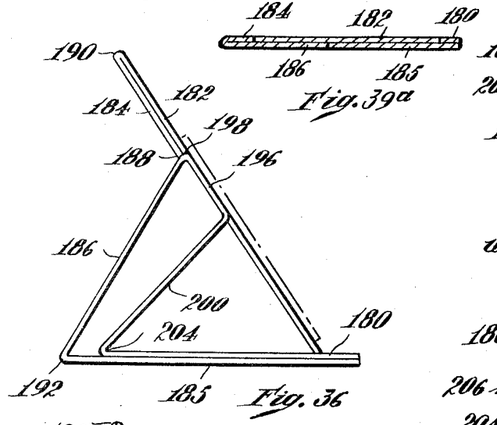
FIG. 36 is an end elevation at the left end of FIG. 35.
FIG. 39a is a section taken on the line 39a—39a of FIG. 39.
Figure 37:
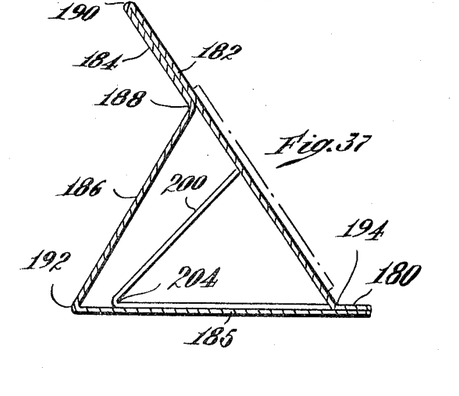
FIG. 37 is a vertical section taken on the line 37—37 of FIG. 35.
Figure 37A:
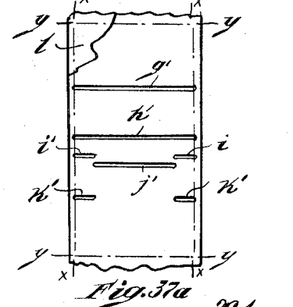
FIG. 37a is a plan view of the initial step in making the blank.

The structure is made by cutting parallel slots v, x and z in a paperboard strip (FIG. 26a), applying a lining l to one side and then cutting through the sheet along lines X—X, Y—Y to separate from the sheet a blank 138 as shown in FIG. 27. The slots v, x and z become in the structure the hinges 136, 132 and 134, dividing the blank into the parts 124, 130, 128 and 126. The blank is turned over and a wrapper sheet w is applied to the opposite side and folded over onto the lining. An impression 133 is made in the part 126 parallel to its distal end to form the part 131 and a multi-leaf booklet b° is fastened to the part 124.

The blank is now folded on the hinge 132 and the part 131 secured to the part 124 so as to take the form shown in FIG. 28. The structure is set up by applying pressure to the hinge 132 downwardly and forwardly relative to the part 124 to force the hinge 132 into engagement with the underside of the part 124.

The sixth form of the structure shown in FIGS. 29 to 34a, inclusive, comprises a part 140 which forms the base, a part 142 rising upwardly and rearwardly therefrom which provides a support for a calendar pad or photograph, and parts 144 and 146—146 connected at their proximal ends by a hinge 148 and at their distal ends by hinges 150 and 152 to the parts 142 and 140 respectively.

The parts 144 and 146—146 comprise a toggle in which the hinge 148 is the knee. The knee is movable from a position at one side of the line of centers of the hinges 150 and 152 where it has contact with the rear side of the part 142, to a position at the other side to permit collapsing the structure to a position in which the parts 142 and 144 lie in a common plane with the parts 140 and 146—146. The part 142 is connected to the part 140 by a hinge 154 which resists angular rotation of the part 142 relative to the part 140 and normally tends to prevent breaking of the toggle. The parts 146—146 have an extension 156 connected thereto by hinges 158—158 and is situated behind the part 144. The extension 156 is supported in an upwardly and rearwardly inclined plane parallel to the part 142 by parts 160, 162 and 164. The part 160 is connected to the part 162 by a hinge 166 and the part 162 is connected to the part 164 by a hinge 168. The part 164 underlies the part 140 and is connected at its forward edge thereto by a hinge 170. The parts 146 and 162 are spaced relative to each other and provide transversely spaced pockets in which the lower ends of writing implements may be thrust through the holes 172—172 made in the parts 156.

The structure is made by cutting spaced parallel slots $a'$, $b'$, $c'$—$c'$, $d'$, $e'$ and $f'$ in a paperboard strip (FIG. 32), applying a lining $l$ to one side and then cutting through the sheet along the lines X—X, Y—Y to separate the blank 172 from the sheet. The slots in the blank become the hinges 148, 150, 152—152, 170, 168 and 166. The blank is turned over and a wrapper sheet $w$ is applied to the opposite side and then folded over and secured to the lining whereupon the blank is subjected to pressing and cutting operations to form an impression which becomes the hinge 154 connecting the part 142 to the part 140, spaced parallel cuts 174—174 extending from the ends of the hinge 154 to the hinge 148 and the holes 173—173. The blank 172 is now folded on the hinge 170 and the part 160 secured to the part 156 to form the structure shown in FIG. 34. The structure is set up by folding the parts 160, 162 and 146—146 upwardly in a clockwise direction relative to the parts 140 and 164.

A seventh form of the structure is shown in FIGS. 35 to 39a, inclusive, comprising a base 180 embodying a port 181, a part 182 hinged along one edge to the part 181 and parts 184 and 186 connected to each other at their proximal ends by a hinge 188 and at their distal ends by hinges 190 and 192 to the parts 182 and 181 respectively. The parts 184 and 186 constitute a toggle in which the hinge 188 is the knee and the latter is movable from a position at one side of the line of centers of the hinges 190 and 192 where it has contact with the underside of the part 182, to a position at the opposite side to permit the parts to be collapsed to positions in which the parts 182 and 184 lie in the plane of the part 181. The part 182 is connected to the part 181 by a hinge 194 which resists angular rotation of the part 182 away from the part 181 and its reactive force operates to hold the knee of the toggle against the rear side of the part 182 when the latter is set up. Parts 196—196 are connected by hinges 198—198 to the upper end of the part 186, incline downwardly therefrom parallel to the plane of the part 182 and are supported at their forward ends by parts 200—200, the latter being connected at their upper ends to the parts 196—196 by hinges 202—202 and at their lower ends to the part 181 by hinges 204—204. The parts 186 and 200 are spaced and form forwardly inclined pockets at each side of the part 182, access to which is provided by holes 204 in the parts 196.

Figure 38:
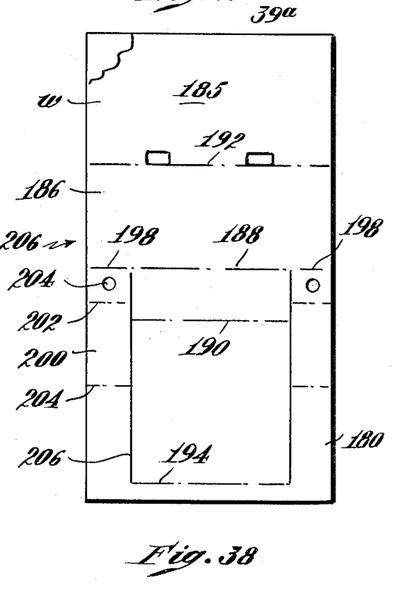
FIG. 38 is a plan view of the blank for making the structure.
Figure 39:
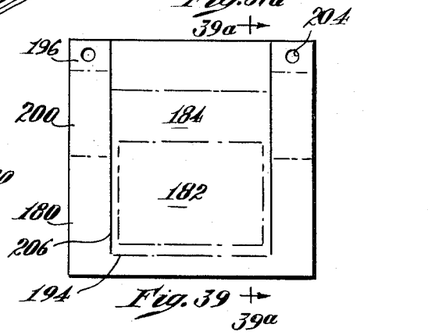
FIG. 39 is a plan view of the blank folded to form the structure and prior setting up.

The structure is made by cutting spaced parallel slots $g'$, $h'$, $i'$—$i'$, $j'$ and $k'$—$k'$ in a paperboard strip (FIG. 37a), applying a lining $l$ to one side and then cutting the sheet along the lines X—X, Y—Y to separate from the sheet a blank 206 as shown in FIG. 38. The slots become in the structure the hinges 192, 188, 198—198, 202—202, 190 and 204—204. The blank is turned over and a wrapper sheet $w$ is applied to the entire surface and folded about the edges and secured to the lining whereupon the blank is subjected to pressing and cutting to form the hinge 194, to make spaced parallel cuts 206 extending from the ends of the hinge 194, through the ends of the hinges 204—204, 190 and 202—202 to the hinges 188, 198—198 and the parts 181 and 185 secured in parallel relation to each other adjacent their distal ends by suitable means to form the structure shown in FIG. 39. The structure may be set up by rotating the parts 186 and 200 in a clockwise direction relative to the parts 181 and 185.

An eighth form of the structure is shown in FIGS. 40 to 44a, inclusive, comprising a part 210 which forms the base, a part 212 which is connected to the base along one edge and extends upwardly and rearwardly therefrom, and parts 214 and 216 (FIG. 42) which are connected at their proximal ends by hinges 218a, 218b, and at their distal ends by hinges 220 and 222 to the parts 212 and 210. The part 212 is connected to the part 210 by a hinge 224 which resists angular movement of the part 212 away from the part 210 and which operates by its reactive pressure to hold the knee of the toggle pressed against the part 210. The parts 214 and 216 constitute a double toggle in which a part 226 provides the connection between them. The part 226 is connected to the part 216 by the hinge 218b and to the part 214 by the hinge 218a. The part 226 extends upwardly and rearwardly from the part 212 and is connected at its upper end by a hinge 228 to a part 230. The part 230 extends downwardly therefrom and is connected at its lower end by a hinge 232 to a part 234 which underlies the part 210. The angular disposition of the parts 226 and 230 provides a pocket through which access is afforded by holes 236 for receiving the lower ends of writing implements.

Figures 40, 41, 42, 42A, 43, 44, 44A:
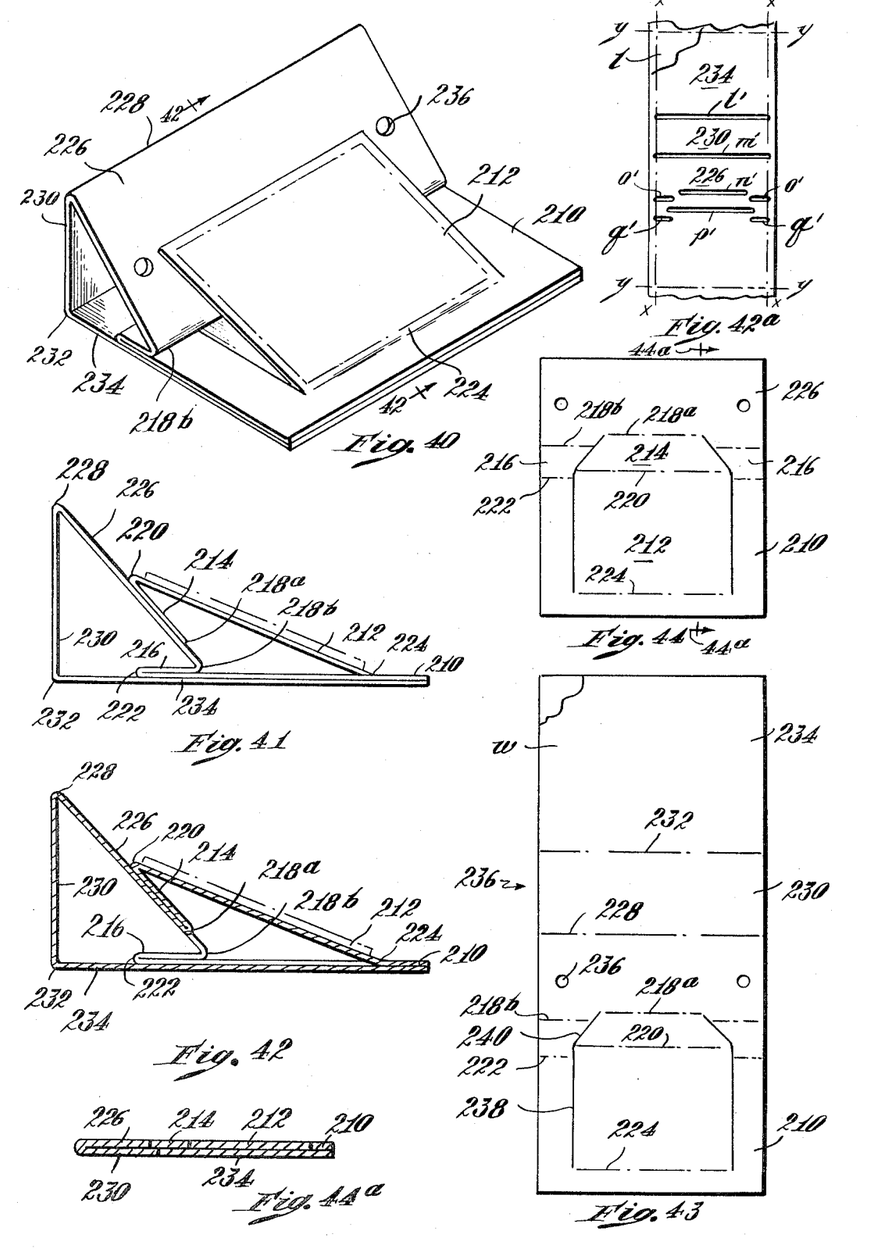
FIG. 40 is a perspective view of an eighth form of the structure.
FIG. 41 is an end elevation as seen from the left end of FIG. 40.
FIG. 42 is a vertical section taken on the line 42—42 of FIG. 40.
FIG. 42a is a plan view of the initial step in making the blank.
FIG. 43 is a plan view of the blank of which the structure is made.
FIG. 44 is a plan view of the blank folded to form the structure and prior to setting up.
FIG. 44a is a section taken on the line 44a—44a of FIG. 44.

The structure is made by cutting spaced parallel slots $l'$, $m'$, $n'$, $o'$—$o'$, $p'$ and $q'$—$q'$ in a paperboard strip (FIG. 42a), applying a lining sheet $l$ to one side and then cutting through the sheet along lines X—X, Y—Y to separate from the sheet a blank 236 as shown in FIG. 43. The slots become in the structure the hinges 232, 228, 218a, 218b—218b, 220 and 222—222. The blank is now turned over and covered on its opposite side with a wrapping $w$ which is folded over onto the lining whereupon the blank is subjected to pressing and cutting to form the hinge 224 in the part 210, to make spaced parallel cuts 238 extending from the ends of the hinge 224 through the ends of the hinges 222—222 and 220 and converging cuts 240 from the ends of the hinge through the ends of the hinge 218b—218b to the ends of the hinge 218a and then punching the holes 236. The blank is folded on the hinge 228 to the form shown in FIG. 44 and the part 234 is secured in parallel relation to the part 210 by suitable means. The structure may be set up by rotating the part 230 in a clockwise direction relative to the parts 210 and 234.

FIGS. 45 to 49a, inclusive, disclose a ninth form of the invention comprising a part 250, a part 252 connected along one edge to the part 250 and parts 254 and 256 connected at their proximal ends by hinges 258 and at their distal ends by hinges 260 and 262 to the parts 250 and 252 respectively. The parts 254 and 256 form a toggle in which the hinges 258 are the knees, the knees being movable from a position at one side of the line of centers of the hinges 260 and 262 to support the part 254 at an angle to the part 250 or to allow the parts to be collapsed to positions in which the parts 252 and 254 are parallel to the parts 250 and 256. The part 252 is fastened to the part 250 by a part 264 which, in turn, is connected to the part 250 by a hinge 266 which resists angular movement of the part 252 away from the part 250, so that its reactive force tends to hold the toggle with the knee 258 engaged with the part 250. The part 254 has separated from it a part 272 and a part 274 joined at their proximal ends by a hinge 276 and connected at their distal ends to the parts 256 and 252 by a hinge 259 and a hinge 278 respectively. The part 272 inclines upwardly at a somewhat sharper angle than the parts 254 and the part 274 inclines upwardly and rearwardly at a somewhat flatter angle than the parts 254. The triangular ararngements of the parts 252, 254 and 272 provide pockets, access to which are afforded by holes 280 for implements and a slot 282 for a memorandum pad.

Figures 45, 46, 47, 47A, 48, 49, 49A:
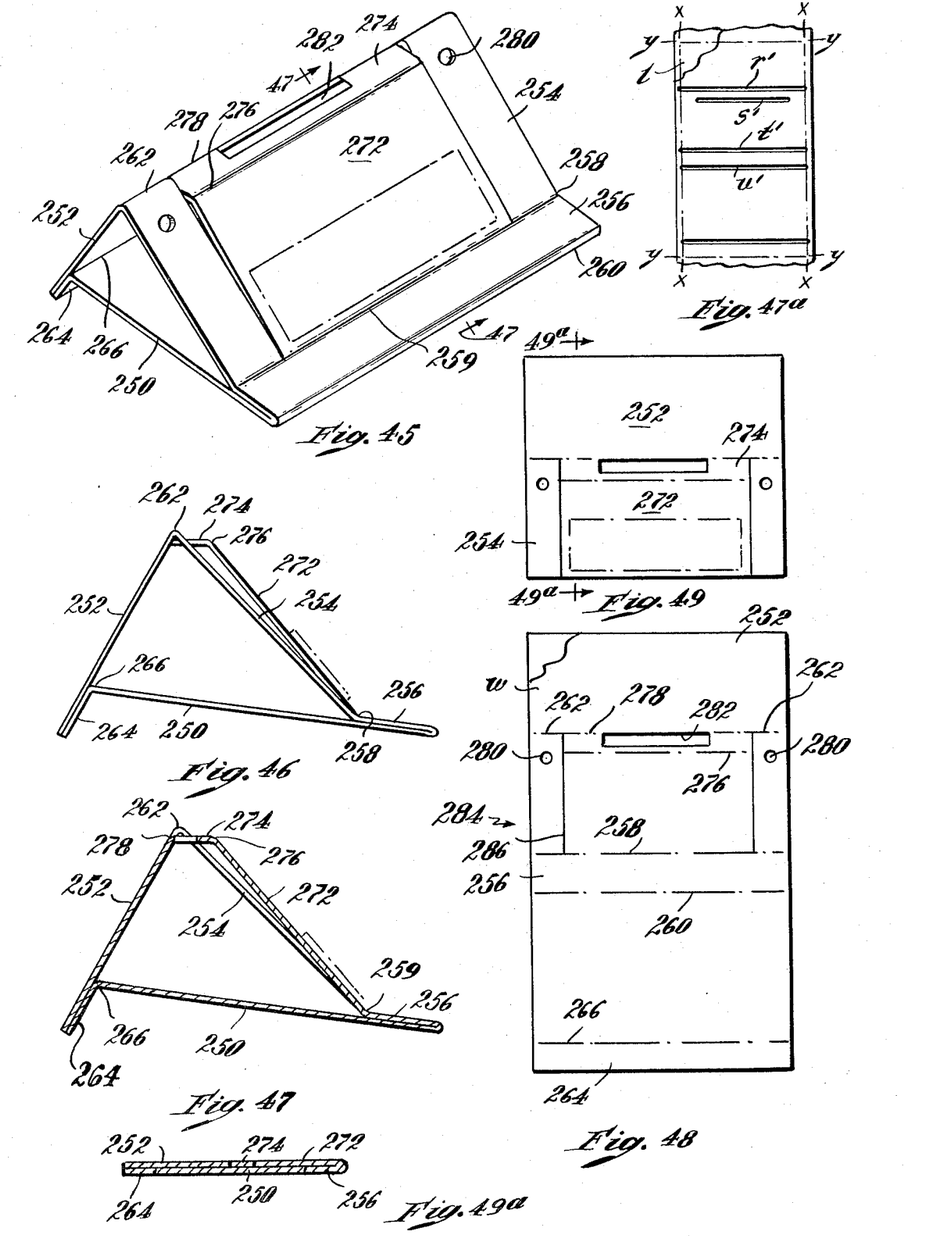
FIG. 45 is a perspective view of a ninth form of the structure.
FIG. 46 is an end elevation as seen from the left end of FIG. 45.
FIG. 47 is a vertical section taken on the line 47—47 of FIG. 45.
FIG. 47a is a plan view of the initial step in making the blank.
FIG. 48 is a plan view of a blank for making the structure.
FIG. 49 is a plan view of the blank folded to make the structure prior to setting up.
FIG. 49a is a section taken on the line 49a—49a of FIG. 49.

The structure is made by cutting spaced parallel slots r', s', t' and u' in a paperboard strip (FIG. 47a), applying a lining l to one side and then cutting the sheet along lines X—X, Y—Y to separate from the sheet a blank 284 (FIG. 48). In the blank the slots r', s', t' and u' become the hinges 262—262, 278, 276, 258 and 260. The blank is turned over and a wrapper w is applied to the other side and folded over onto the lining whereupon the blank is subjected to pressing and cutting to form the hinge 266, to cut spaced parallel lines 286 from the hinge 258 through the ends of the hinge 276 to the hinges 262—262 and 278 to punch the holes 280 and to cut the slot 282. The blank 284 is now folded on the hinge 258 and the part 264 secured to the distal end of the part 252. The folded structure as shown in FIG. 49 is set up by rotating the part 264 in a counterclockwise direction relative to the part 250.

The structures have in common toggle parts operative to raise the component parts into position and to maintain them securely in place, components which when folded are uniformly flat and compact and component parts which can be manufactured by means of die cutting and glueing machinery with the least amount of manual assembly.

It should be understood that the present disclosure is for the purpose of illustration only and that this invention includes all modifications and equivalents which fall within the scope of the appended claims.

I claim:

1. An easel structure for supporting a calendar pad, photograph or the like, comprising a rigid base, a first part secured along one end to the base, said first part being resistant to deflection, second and third parts hinged, respectively, to each other along their proximal ends and to the base and first part at their distal ends, said second and third parts constituting a toggle situated between the base and first part, and the hinge connecting the proximal ends of the second and third parts constituting the knee of the toggle, said knee abutting and supporting the third part parallel to and in contact with the first part, and said toggle permitting folding of the parts into parallel relation.

2. An easel structure for supporting a calendar pad, photograph, or the like, comprising a base, a first part connected to the base and rotatable with respect thereto, said first part being constructed and arranged to offer resistance to rotation relative to the base, second and third parts connected to each other at their proximal ends and at their distal ends to the base and first part, said base comprising the second part and a fourth part hingedly connected to the base along spaced parallel lines near the rear side, the second part being situated forwardly of the fourth part and being shorter, and a fifth part connecting the upper edges of the second and fourth parts, said fifth part extending upwardly from the base beyond the first part and said third part extending downwardly from the upper edge behind the first part, and a hinge connecting the lower edge of the third part to the upper edge of the second part.

3. An easel structure for supporting a calendar pad, photograph, or the like, comprising a base, a first part connected to the base, second and third parts connected at their proximal ends to each other and at their distal ends to the base and first part, said base comprising a fourth part rising from the rear end of the base, said fourth part being connected to the upper end of the second part, said second part extending forwardly and downwardly to substantially the base, and hinge means connecting the lower edge of the second part to the base, said first part extending from the base upwardly and intersecting the second part intermediate the top and bottom.

4. An easel structure for supporting a calendar pad, photograph, or the like, comprising a rigid base, a first toggle part hingedly connected at one end to one end of the base, said first toggle part extending upwardly and forwardly from said one end of the base, said base and first toggle part embodying lower and upper plies and said upper ply providing a panel and a second toggle part hinged to each other at one end and at their other ends to the upper plies of the base and first toggle part from which they are cut, said panel and second toggle part extending upwardly and rearwardly from the upper end of the first toggle part in parallel engagement with each other, the hinge connecting the toggle parts constituting a knee supporting said panel in said upwardly and rearwardly inclined position, said toggle being shiftable by breaking the knee at the opposite side of the line of centers of the toggle parts to dispose the panel and second toggle part in a common plane parallel to the lower plies of the base and first toggle part.

5. A structure according to claim 4, comprising a memoranda panel in the lower ply of the base hinged thereto along said one end, said memoranda panel being adapted to be exposed by rotating the structure upwardly and rearwardly relative to said memoranda panel so that the hinge at the junction of said panel and the second toggle part constitutes a foot supporting the structure in an upright position relative to the memoranda panel.

6. An easel structure for supporting a calendar pad, photograph, or the like, comprising a first part, a second part hinged to one end of the first part and disposed at an angle to one surface of the first part, a first toggle part integrally hinged at one end to the other end of the first part and disposed parallel to the first part at the side opposite the first part and extending rearwardly therefrom toward the one end of the first part, a second toggle part integrally hinged at one end to the opposite end of the first toggle part, said second toggle part diverging from the surface of said first part rearwardly toward the one end of the first part, and a connecting part integrally hinged at one end to the distal end of the second toggle part and secured at its opposite end to the surface of the second part, said second part, first part and first toggle part collectively corresponding in length to the second toggle part and connecting part so that said parts are disposable in parallel planes by breaking the knee at the junction of the toggle parts in the opposite direction.

7. A structure according to claim 6, wherein by rotation the connecting part is adapted to be the base and to support the first part in an upwardly and rearwardly inclined position.

8. A structure according to claim 6, wherein the second toggle part and connecting part contain third and fourth parts, cut out of the second toggle part and connecting part along transversely spaced parallel lines, connected, respectively, to the first toggle part by a hinge coinciding with the hinge connecting the first and second toggle parts, and to each other by a hinge.

9. An easel structure for supporting a calendar pad, photograph, or the like, comprising a first part, a first toggle part integrally hinged at one end to one end of the first part and extending rearwardly therefrom in parallel engagement with the surface of the first part, a second toggle part integrally hinged to the opposite end of the first toggle part, said second toggle part extending upwardly and rearwardly from the first part, a second part integrally connected to the second toggle part by transversely spaced hinges situated intermediate the hinge connecting the toggle parts and the upper end of the second toggle part, said second part extending downwardly from the rear side of the second toggle part, a third part integrally connected by a hinge to the second part, said third part having parallel engagement with the surface of the first part, and means fastening the third part to the surface of the first part.

10. An easel structure for supporting a calendar pad, photograph, or the like, comprising a first part, a first toggle part integrally hinged at one end to one end of the first part and extending rearwardly therefrom in parallel engagement with the surface of the first part, a second toggle part integrally hinged to the opposite end of the first toggle part, said second toggle part extending upwardly and rearwardly from the first part, a second part integrally connected to the second toggle part by transversely spaced hinges situated intermediate the hinge connecting the toggle parts and the upper end of the second toggle part, said second part extending downwardly from the rear side of the second toggle part, a third part hingedly connected by a hinge to the second part, said third part having parallel engagement with the surface of the first part, a fourth part integrally connected with the third part by a hinge at the other end of the first part, said fourth part underlying the first part and being coextensive therewith, and means fastening the third part to the surface of the first part.

11. A structure according to claim 10, wherein the structure is rotatable about the rear end of the fourth part to dispose the first part in an upright, rearwardly inclined position with the end of the second toggle part providing a supporting leg and the fourth part exposed.

12. An easel structure for supporting a calendar pad, photograph, or the like, comprising a first part adapted to be supported in an inclined position for supporting a memorandum pad, a first toggle part integrally connected at one end by a hinge to one end of the first part, said first toggle part having parallel engagement with the lower surface of said first part and extending from said one end toward the other end, a second toggle part integrally connected at one end by a hinge to the opposite end of said first toggle part and extending downwardly at an angle from the lower surface of said first part, a second part integrally connected at one end by a hinge to the opposite end of said second toggle part and extending therefrom into engagement with the lower surface of said first part, a third part integrally connected at one end by a hinge to said second toggle part, said third part having parallel engagement with the lower surface of said first part, extending to said other end of said first part, and means securing said third part to the lower surface of said first part, said first part and first toggle part collectively corresponding in length to said second toggle part, said second part and said third part.

13. An easel structure for supporting a calendar pad, photograph or the like, comprising a base part having two plies, the forward ends of which coincide and the rear ends of which are displaced relative to each other, integrally hinged portions at the rear ends of the base plies extending upwardly in spaced relation from the base part, said upwardly extending portions being joined and providing hollow supports at the rear side of the base part, a panel hingedly connected to the base part forwardly of the supports, said panel extending rearwardly and upwardly therefrom, and means connecting the panel to the supports above the base part.

14. A structure according to claim 13, wherein the last-named means is a toggle part.

15. A structure according to claim 13, wherein the supports contain holes providing access to the interior thereof into which may be set the lower ends of writing implements.

16. An easel structure for supporting a calendar pad, photograph or the like, comprising a base, a first part connected to the base and rotatable with respect thereto, said first part however resisting such rotation and tending to return, and second and third parts connected to each other at their proximal ends and at their distal ends to the base and to the first part, said first part extending upwardly and rearwardly from the base and said third part extending downwardly behind the first part, and said base comprising said second part and a fourth part hinged to the base along spaced parallel lines near the rear side of the base, a fifth part joining the upper ends of the second and fourth parts, and a hinge connecting the lower edge of the third part to the fifth part.

17. An easel structure for supporting a calendar pad, photograph or the like, comprising a base, a first part connected to the base and rotatable with respect thereto, said first part being constructed and arranged to offer resistance to rotation relative to the base, second and third parts connected to each other at their proximal ends and at their distal ends to the base and first part, said first part comprising fourth and fifth parts hingedly connected at their lower ends to the base along spaced parallel lines near the rear edge, the fourth part being situated forwardly of the fifth part and being shorter, and a sixth part connecting the upper ends of the fourth and fifth parts, said sixth part being inclined downwardly from the upper edge of the fifth part to the upper edge of the fourth part.

References Cited by the Examiner
UNITED STATES PATENTS

| | | | |
|---|---|---|---|
| 1,634,715 | 7/1927 | Huebner | 206—45.24 |
| 1,687,875 | 10/1928 | Meller | 40—124.1 |
| 2,464,879 | 3/1949 | Mathewson | 40—124.1 |
| 3,130,510 | 4/1964 | Nichols | 248—465 X |
| 3,168,192 | 2/1965 | Nicholson et al. | 206—45.24 |

CLAUDE A. LE ROY, *Primary Examiner.*

R. P. SEITTER, *Assistant Examiner.*